US008806080B1

(12) United States Patent
Temple, III (10) Patent No.: US 8,806,080 B1
(45) Date of Patent: Aug. 12, 2014

(54) HARDWARE SIZING

(71) Applicant: International Business Machines Corporation, Armonk, NY (US)

(72) Inventor: Joseph L. Temple, III, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/832,174

(22) Filed: Mar. 15, 2013

(51) Int. Cl.
*G06F 11/34* (2006.01)
*G06F 3/00* (2006.01)

(52) U.S. Cl.
USPC ............. 710/18; 710/2; 710/5; 710/8; 710/15

(58) Field of Classification Search
None
See application file for complete search history.

(56) References Cited

U.S. PATENT DOCUMENTS

| | | | |
|---|---|---|---|
| 6,560,569 B1 | 5/2003 | Abu El Ata | |
| 7,957,948 B2 | 6/2011 | Zink et al. | |
| 8,065,256 B2 | 11/2011 | Yuyitung et al. | |
| 8,108,857 B2 | 1/2012 | Tylutki et al. | |
| 2007/0250829 A1 | 10/2007 | Hillier et al. | |
| 2008/0022284 A1* | 1/2008 | Cherkasova et al. | 718/104 |
| 2012/0130680 A1 | 5/2012 | Zink et al. | |
| 2012/0239792 A1 | 9/2012 | Banerjee et al. | |
| 2012/0265881 A1* | 10/2012 | Chen et al. | 709/226 |

OTHER PUBLICATIONS

Cesta et al, "Leveraging Diverse Regression Approaches and Heterogeneous Machine Data in the Modeling of Computer Systems Performance," WORLDCOMP2011, Proceedings of MSV 2011, Jul. 20, 2011, 7 pages.
Guz et al., "Threads vs. Caches: Modeling the Behavior of Parallel Workloads," 2010 IEEE International Conf. on Computer Design (ICCD), Oct. 3-6, 2010, pp. 274-281.
Temple, Joe., "Performance Architecture and Platform Positioning", presentation at SHARE in Anaheim, Aug. 6, 2012; online at SHARE. org/AnaheimEval; 28 pages.

* cited by examiner

*Primary Examiner* — Scott Sun
(74) *Attorney, Agent, or Firm* — Cantor Colburn LLP; Margaret McNamara (57) ABSTRACT

According to an exemplary embodiment of this disclosure, a computer-implemented method may include selecting a first machine to be sized. A first throughput value and a first capacity value may be obtained for the first machine. A base machine may be selected. A base throughput value and a base capacity value may be obtained for the base machine. The first throughput value may be normalized, with a computer processor, to the base throughput value to product a normalized throughput value. The first capacity value may be normalized to the base capacity value to produce a normalized capacity value. A workload weight may be determined for the first machine, based at least in part on comparing the first machine to the base machine. A workload metric may be calculated as a weighted average of the normalized throughput value and the normalized capacity value.

20 Claims, 4 Drawing Sheets

HARDWARE SIZING

BACKGROUND

Various embodiments of this disclosure relate to system performance measurement tools and, more particularly, to hardware sizing.

Information technology professionals use common metrics, or sizers, for describing the relative capacities and performance capabilities of machines. These metrics are meant to indicate what workloads machines can handle and which machines are needed to handle expected workloads. The common metrics, however, do not represent good practice.

In general, the objective of a sizer is to determine how many of a particular base machine are needed to equal a machine being sized. By using a common base machine, various sized machines can be compared against one another. Unfortunately, conventional sizers consider the throughput rate at a steady state as the metric of interest. Throughput rate cannot be maximized without giving up utilization, response time, or the number of loads held, e.g., users, applications, virtual machines, and JVMs.

These conventional sizing methods are valid if and only if the metric of choice is a ratio of maximum throughput rates under steady state conditions. In modern virtualized environments, such metrics are insufficient to determine the relative capacities of machines unless the throughput rate is the metric of choice and not simply a convenient way to get a measured ratio.

SUMMARY

According to one embodiment of this disclosure, a computer-implemented method may include selecting a first machine to be sized. A first throughput value and a first capacity value may be obtained for the first machine. A base machine may be selected. A base throughput value and a base capacity value may be obtained for the base machine. The first throughput value may be normalized, with a computer processor, to the base throughput value to product a normalized throughput value. The first capacity value may be normalized to the base capacity value to produce a normalized capacity value. A workload weight may be determined for the first machine, based at least in part on comparing the first machine to the base machine. A workload metric may be calculated, with a computer processor, as a weighted average of the normalized throughput value and the normalized capacity value, where the normalized capacity value is weighted by the workload weight and the normalized throughput value is weighted by one minus the workload weight.

In another embodiment, a system includes a selection device and a processor. The selection device may be configured to receive a selection of a first machine and a base machine. The processor configured to obtain a first throughput value and a first capacity value for the first machine; obtain a base throughput value and base capacity value for the base machine; normalize the first throughput value to the base throughput value to produce a normalized throughput value; normalize the first capacity value to the base capacity value to produce a normalized capacity value; determine a workload weight for the first machine, based at least in part on comparing the first machine to the base machine; and calculate a workload metric for the first machine as a weighted average of the normalized throughput value and the normalized capacity value, where the normalized capacity value is weighted by the workload weight and the normalized throughput value is weighted by one minus the workload weight.

In yet another embodiment, a computer program product may include a computer readable storage medium having computer readable program code embodied thereon. The computer readable program code may be executable by a processor to perform a method that includes selecting a first machine to be sized. According to the method, a first throughput value and a first capacity value may be obtained for the first machine. A base machine may be selected. A base throughput value and a base capacity value may be obtained for the base machine. The first throughput value may be normalized to the base throughput value to product a normalized throughput value. The first capacity value may be normalized to the base capacity value to produce a normalized capacity value. A workload weight may be determined for the first machine, based at least in part on comparing the first machine to the base machine. A workload metric may be calculated as a weighted average of the normalized throughput value and the normalized capacity value, where the normalized capacity value is weighted by the workload weight and the normalized throughput value is weighted by one minus the workload weight.

Additional features and advantages are realized through the techniques of the present disclosure. Other embodiments and aspects of the disclosure are described in detail herein and are considered part of the disclosure. For a better understanding of the various embodiments, along with their advantages and features, refer to the description and to the drawings.

BRIEF DESCRIPTION OF THE DRAWINGS

The subject matter regarded as the invention is particularly pointed out and distinctly claimed in the claims at the conclusion of the specification. The forgoing and other features and advantages of tis disclosure are apparent from the following detailed description taken in conjunction with the accompanying drawings in which:

DETAILED DESCRIPTION

Various embodiments of this disclosure provide tools for sizing machines, which improve upon conventional sizing tools.

Figure 1:
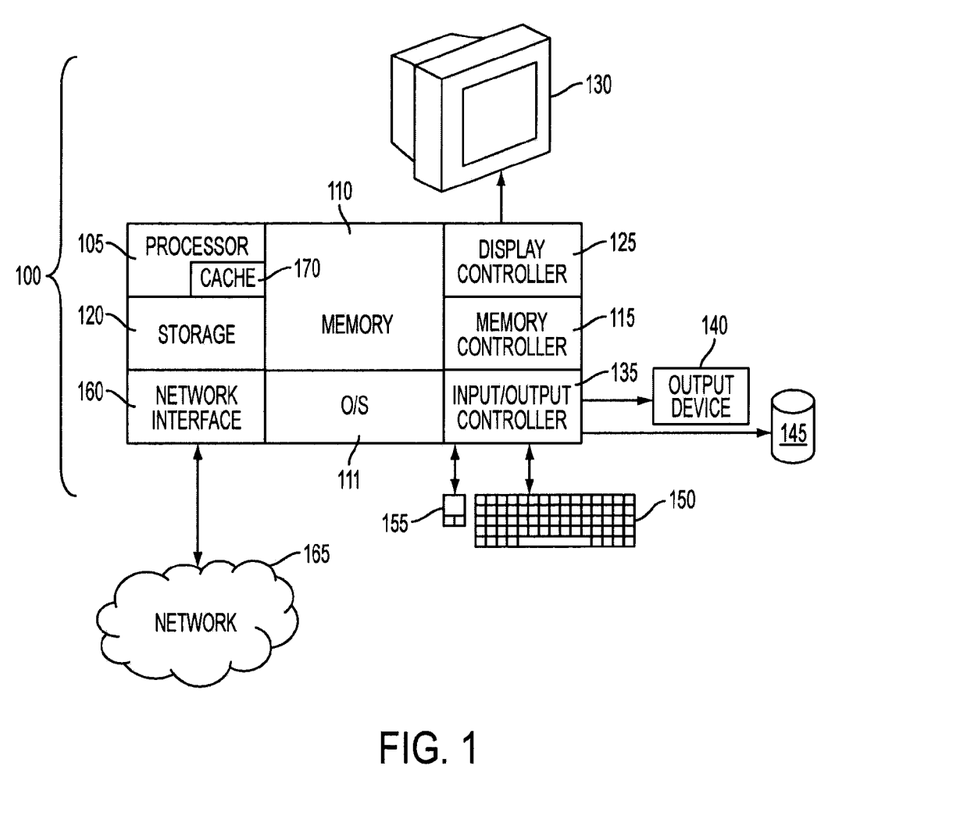
FIG. 1 illustrates a block diagram of a computing device useable with a system according to this disclosure.

FIG. 1 illustrates a block diagram of a computing device 100 for use in practicing the teachings of this disclosure, according to some embodiments. The methods described in this disclosure may be implemented in hardware, software (e.g., firmware), or a combination thereof. In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications. Further, the local interface may include address, control, or data connections to enable appropriate communications among these components.

The processor 105 is a hardware device for executing hardware instructions or software, particularly those stored in memory 110. The processor 105 may be any custom made or commercially available processor, a central processing unit (CPU), an auxiliary processor among several processors associated with the computer 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The system 100 may further include a display controller 125 coupled to a display 130. In an exemplary embodiment, the system 100 may further include a network interface 160 for coupling to a network 165. The network 165 may be an IP-based network for communication between the computer 100 and any external server, client and the like via a broadband connection. The network 165 transmits and receives data between the computer 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Embodiments of this disclosure improve upon conventional hardware sizers. Exemplary embodiments of this disclosure may be systems, methods, and computer program products that use fundamental design parameters, in some cases supplemented by standard capacity ratings, to size hardware based on a throughput parameter, a capacity parameter, and a workload weight.

The workload weight may be estimated from structural analysis and, in some cases, known benchmark data. The weight may be applicable to a wide range of systems. Embodiments of this disclosure may be particularly useful when comparing enterprise-class machines to stripped-down blade servers and computer nodes of distributed systems.

Three fundamental parameters to socket design are thread speed, cache size, and thread count. Analysis of these three parameters demonstrates that cache size and thread speed are inversely proportional to thread count. In other words, the more threads a socket supports, the less cache size and thread speed it will have. With respect to cache size, this is because thread count is naturally limited by core size, and cache size either determines the core size or reduces the socket real estate upon which cores may be added. With respect to thread speed, at an optimal balance of core size and cache size, additional threads can be added through multithreading the cores. Doing so, however, does not yield linear scaled throughput, which by Little's law yields lower thread speed.

Figure 2:
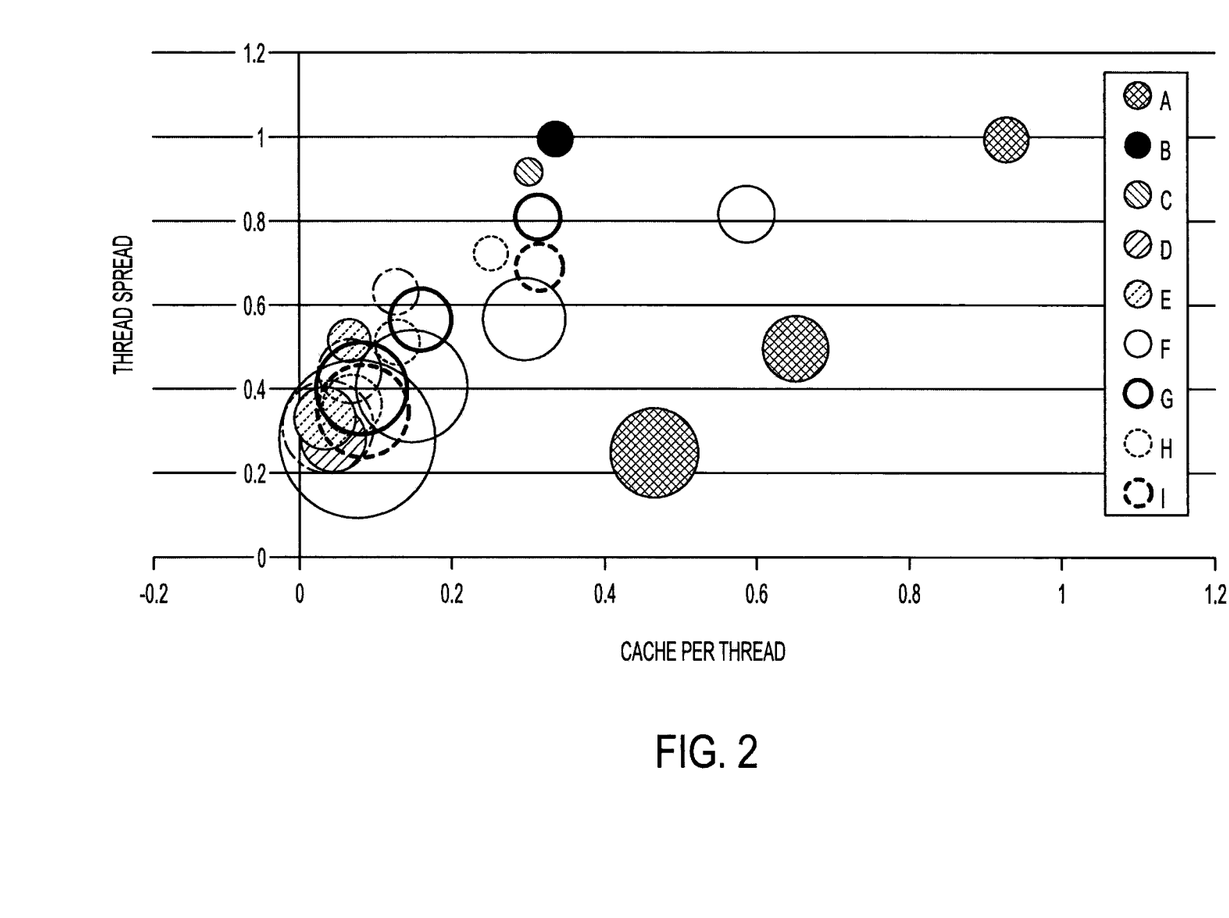
FIG. 2 is a graph illustrating trade-offs between cache size, thread speed, and thread count for select machines.

Thus, machines may be represented in three-dimensional space, where x is cache per thread, y is thread speed, and z is thread count. An example graph of such representation is shown in FIG. 2, in which the bubble size represents the thread count.

Maximum throughput is given by thread speed multiplied by thread count, and thread capacity is given by thread speed multiplied by cache per thread. Exemplary embodiments of this disclosure may calculate thread speed by multiplying the clock speed by the multithreading throughput ratio, divided by the threads per core. Throughput and capacity are related to the three hardware parameters mentioned above (i.e., thread speed, cache size, and thread count). Thus, FIG. 3 is a graph illustrating trade-offs in throughput versus capacity for the same machines represented in FIG. 2.

Figure 3:
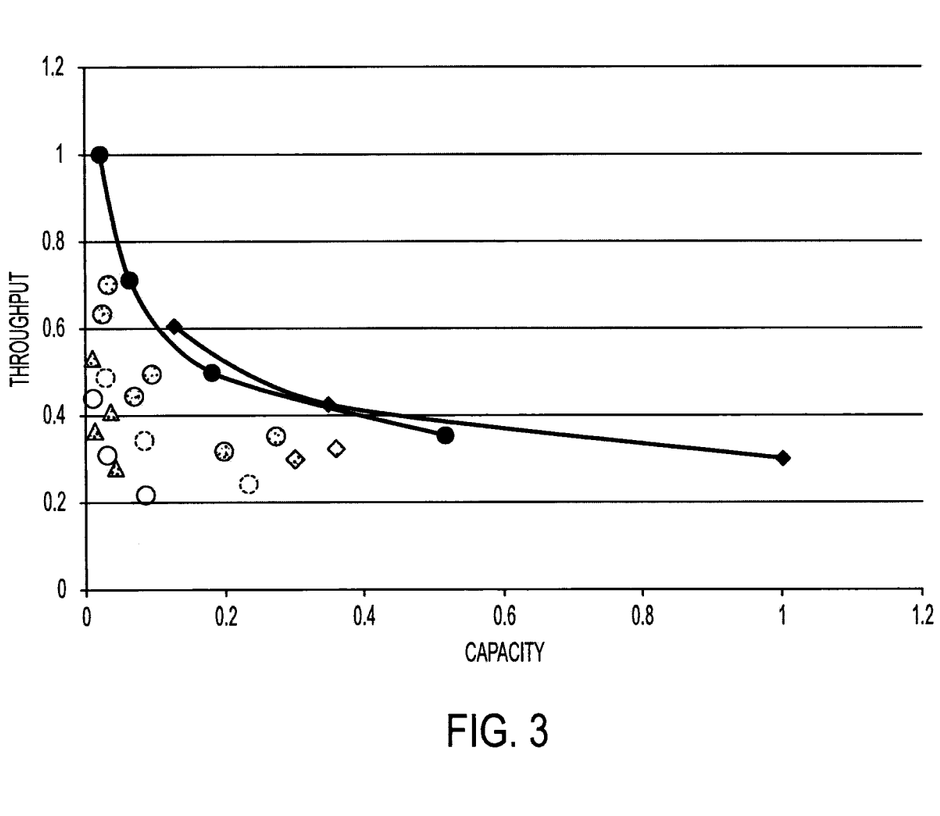
FIG. 3 is a graph illustrating trade-offs of throughput versus capacity for the same machines represented in FIG. 2.

In FIG. 3, the two solid lines represent two speculative servers. The line with diamond-shaped points represents a first machine with high speed and cache size driving high capacity. The line with circle-shaped points represents a second machine with high thread count driving high throughput. Accordingly, it is asserted that workloads relate to some combination of throughput and capacity. It is further asserted that relative capacity varies with the relative contribution, or weight (w), of capacity (C) and throughput (TP) in creating a workload metric (WLM) for a given workload.

More specifically, the workload metric may be calculated as a weighted average of capacity and throughput, as follows:

$$WLM = wC + (1-w)TP$$

In FIG. 3, the first machine (i.e., with diamond-shaped points) will improve as the weight (w) increases, while the second machine (i.e., with circle-shaped points) will improve as the weight (w) decreases. Thus, FIG. 3 provides insight that is not recognized in conventional sizers.

In general, industry standard benchmarks are based on low-weight loads. Examination of the Relative Server Performance Estimate 2 (RPE2) metric indicates that RPE2 provides a lower weight than the throughput parameter when comparing power machines, such as many machines having Intel® chipsets. This is due to differences in design, benchmark optimizations, compilers, and operating system path length in these power machines as compared to others. According to an exemplary embodiment of this disclosure, hardware-sizing may consider an RPE2 parameter when it is available and appropriate. It may not, however, be appropriate to use in the case of power machines. Alternatively, an exemplary embodiment may consider some other metric value, such as, for example, another known benchmark or a specific performance measurement that is taken for the purpose of determining the workload metric. The RPE2 value or other metric value may be used in the above formula as the throughput value (TP).

Figure 4:
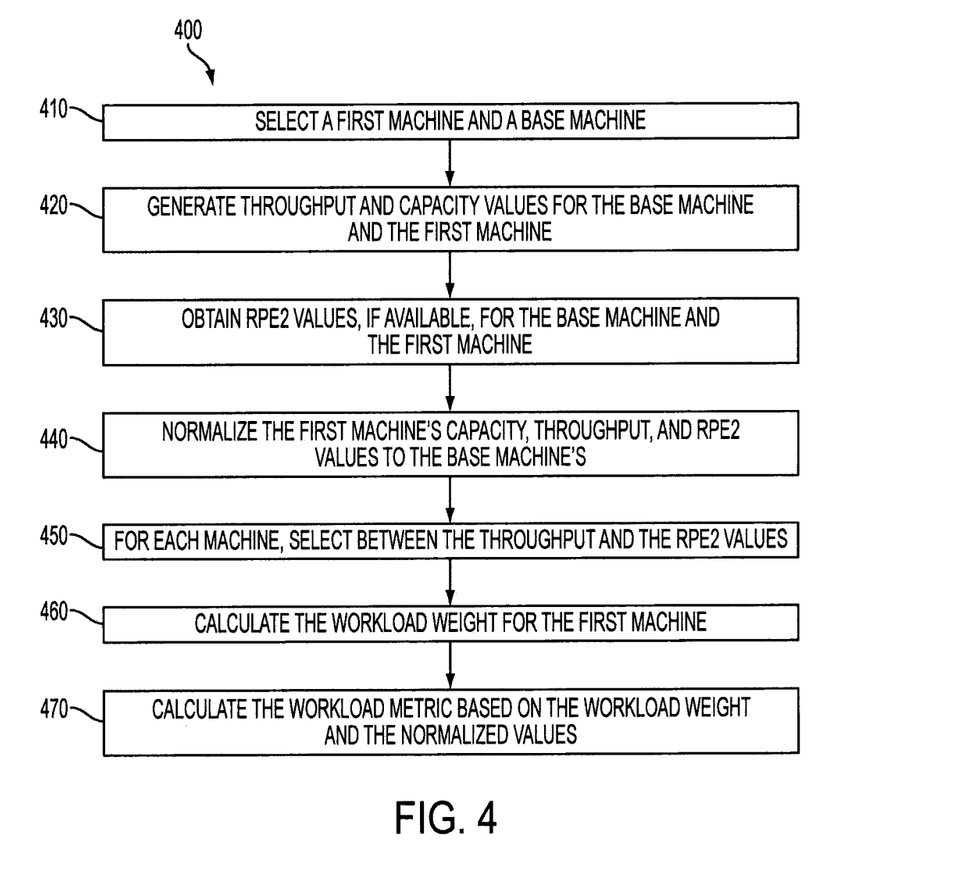
FIG. 4 is a flow diagram of a method for sizing a machine, according to an exemplary embodiment of this disclosure.

FIG. 4 is a flow diagram of a method 400 for sizing machines, based on the assertions made above, according to an exemplary embodiment of this disclosure. At block 410, two machines may be chosen to be compared to each other: a first machine and a base machine. The base machine may be used, essentially, as a unit of measure for the first machine. If possible, a base machine with an available RPE2 or other known metric may be selected. It will be understand that references to the RPE2 value with respect to FIG. 4 and its accompanying description may alternatively refer to some other suitable metric that is known or generated for the purpose of determining the workload metric.

The selection of the first machine and base machine, at block 410, may be received though various selection mechanisms or devices. For example, and not by way of limitation, the machines may be selected via an input device or the selection may be received via a network interface device.

At block 420, throughput and capacity values may be generated for each chosen machine. At block 430, an RPE2 value may be obtained for one or both of the machines, if available. At block 440, the capacity, generated throughput, and RPE2 values of the first machine may be normalized to the base machine. To normalize, the first machine's values may be divided by the values for the base machine, calculating the ratios. In other words, the base machine's capacity, generated throughput, and RPE2 values may be set to 1, and the first machine's capacity, generated throughput, and RPE2 values may be set relative to those base machine values. At block 450, for each of the base machine and the first machine, if the RPE2 value is available, a selection may be made between the normalized RPE2 value and the normalized generated throughput. In general, whichever is deemed to better represent a machine's workload may be selected as the throughput value used to calculate the workload metric (WLM) for the first machine. Machines that tend to do a large amount of work per cycle are generally not represented well by their RPE2 values, so for those machines, the normalized generated throughput may be a better selection.

At block 460, the workload weight (w) for the above WLM formula may be determined for sizing the first machine. There may be various reasonable means for calculating the workload weight. For example, and not by way of limitation, if benchmark data is known or available for lookup, the core ratio of the chosen machines may be calculated from such benchmark data. In that case, the workload weight (w) may be computed as follows:

$$w = (\text{Core Ratio} - \min(TP, RPE2))/(C - \min(TP, RPE2))$$

For the above formula to work as desired, the core ratio (in addition to TP, RPE2, and C) may be normalized to the base machine. With the weight (w) calculated, machines may now be sized more effectively than through conventional means, and with a more intuitive feel for what is driving workload balance.

It should be noted that "min(TP, RPE2)" refers to the choice that may be made between using the RPE2 value versus the generated throughput value, both of which represent throughput to some degree. Whichever of these values is used may be substituted in the above equation for "min(TP, RPE2)." Additionally, various common metric benchmarks may be used as an alternative to RPE2, so long as there is evidence that the clock ratio provides an inaccurate starting ratio.

At block 470, the WLM may be calculated for the first machine. The WLM may then indicate how many of the base machine are needed to equate to the first machine.

Variability may need to be taken into account, such as by using Rogers' Equation, which provides a theory for the capacity of larger machines and penalizes lower capacity machines. Rogers' Equation for calculating average utilization (Uavg) is given by:

$$U\text{avg} = 1/(1 - kc^* \text{SQRT}(N))$$

In the above, k is a service level parameter, where a high value of k refers to a tighter service level. Generally, the default value of k is 2. Also in the above, c is the index of variability, which may be calculated as the standard deviation of a single load instance divided by the mean of that load. This value may be either assumed or measured. Generally, a value of c greater than 1.5 is considered to be high; between 0.75 and 1.5 is considered moderate; and less than 0.75 is considered low. Traditionally, N is the number of loads on a server, where N may be less than 1 if the server is distributed.

Rogers' Equation may be used to calculate a modification of the core ratio of the chosen machines, based on inputs k and c, by taking the raw core ratio of the machines as N, and using Uavg as a modified core ratio value. This assumes normalization with the larger machine set to the norm (i.e., the larger machine is taken as the base machine), where the larger machine may be determined to be the machine with the highest "size parameter," which is the capacity times the number of cores in the each machine, node, or socket.

One may also consider solution design and operational practice, by setting a maximum value for peak long term utilization, e.g., intervals of 15 minutes. The result may be a saturation design point, which may reduce the raw capacity of the machines when the saturation design point is set to less than 1. Relative capacity may be further adjusted by multiplying the core ratio by the saturation design point ratio.

Virtual machine (VM) density may also be taken into account. For example, IBM's PowerVM feature has a built-in VM density limitation of 10 VMs per core, but better performance can be achieved at lower densities. In contrast, IBM System z is comfortable with densities that are 2-5 times that of PowerVM best-performance densities. Thus, if a load is dense with VMs, System z's relative capacity climbs. Accordingly, the core ratio may be adjusted to account for VM density. For example, with PowerVM machines, the core ratio may be adjusted by the VM Density divided by 10.

Symmetric multiprocessing (SMP) scaling ratio differences may also be considered. As the workload weight (w) climbs, the scaling with thread count gets more sublinear. This may be accounted for by using a standard SMP curve to estimate the effect, or by measuring saturation or actual SMP ratios and then applying them to the core count, thereby driving a change in the throughput ratio. This may reduce the max throughput estimate that comes from simply multiplying thread speed by thread count.

The above model for sizing machines may be integrated into a method, system, or computer program product according to various embodiments of this disclosure. For instance, a system, method, or computer program product given appropriate data as input may size machines that are selected by a user or otherwise identified.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for sizing a machine, the method comprising:
    selecting a first machine to be sized;
    obtaining a first throughput value and a first capacity value for the first machine;
    selecting a base machine;
    obtaining a base throughput value and base capacity value for the base machine;
    normalizing, with a computer processor, the first throughput value to the base throughput value to produce a normalized throughput value;
    normalizing the first capacity value to the base capacity value to produce a normalized capacity value;
    determining a workload weight for the first machine, based at least in part on comparing the first machine to the base machine; and
    calculating a workload metric for the first machine as a weighted average of the normalized throughput value and the normalized capacity value, where the normalized capacity value is weighted by the workload weight and the normalized throughput value is weighted by one minus the workload weight.

2. The method of claim 1, wherein obtaining the base throughput value comprises setting the first throughput value to a known metric value associated with the first machine.

3. The method of claim 1, wherein determining the workload weight for the first machine comprises calculating a core ratio of the first machine and the base machine, based at least in part on known benchmarks for the first machine and the base machine.

4. The method of claim 3, further comprising modifying the core ratio based on Rogers' Equation before calculating the workload weight.

5. The method of claim 3, further comprising multiplying the core ratio by a saturation design point ratio before calculating the workload weight.

6. The method of claim 3, further comprising adjusting the core ratio based on a virtual machine density of the first machine before calculating the workload weight.

7. The method of claim 3, further comprising adjusting the core ratio based on a symmetric multiprocessing scaling ratio before calculating the workload weight.

8. A system comprising:
    a selection device configured to receive a selection of a first machine and a base machine; and
    a processor configured to:
        obtain a first throughput value and a first capacity value for the first machine;
        obtain a base throughput value and base capacity value for the base machine;
        normalize the first throughput value to the base throughput value to produce a normalized throughput value;
        normalize the first capacity value to the base capacity value to produce a normalized capacity value;
        determine a workload weight for the first machine, based at least in part on comparing the first machine to the base machine; and
        calculate a workload metric for the first machine as a weighted average of the normalized throughput value and the normalized capacity value, where the normalized capacity value is weighted by the workload weight and the normalized throughput value is weighted by one minus the workload weight.

9. The system of claim 8, the processor being further configured to obtain the first throughput value by setting the first throughput value to a known metric value associated with the first machine.

10. The system of claim 8, the processor being configured to determine the workload weight by, at least, calculating a core ratio of the first machine and the base machine, based at least in part on known benchmarks for the first machine and the base machine.

11. The system of claim 10, the processor being further configured to modify the core ratio based on Rogers' Equation before calculating the workload weight.

12. The system of claim 10, the processor being further configured to multiply the core ratio by a saturation design point ratio before calculating the workload weight.

13. The system of claim 10, the processor being further configured to adjust the core ratio based on a virtual machine density of the first machine before calculating the workload weight.

14. The system of claim 10, the processor being further configured to adjust the core ratio based on a symmetric multiprocessing scaling ratio before calculating the workload weight.

15. A computer program product comprising a computer readable storage medium having computer readable program code embodied thereon, the computer readable program code executable by a processor to perform a method comprising:
    selecting a first machine to be sized;
    obtaining a first throughput value and a first capacity value for the first machine;
    selecting a base machine;
    obtaining a base throughput value and base capacity value for the base machine;
    normalizing the first throughput value to the base throughput value to produce a normalized throughput value;
    normalizing the first capacity value to the base capacity value to produce a normalized capacity value;
    determining a workload weight for the first machine, based at least in part on comparing the first machine to the base machine; and
    calculating, with a computer processor, a workload metric for the first machine as a weighted average of the normalized throughput value and the normalized capacity value, where the normalized capacity value is weighted by the workload weight and the normalized throughput value is weighted by one minus the workload weight.

16. The computer program product of claim 15, wherein determining the workload weight for the first machine comprises calculating a core ratio of the first machine and the base machine, based at least in part on known benchmarks for the first machine and the base machine.

17. The computer program product of claim 16, the method further comprising modifying the core ratio based on Rogers' Equation before calculating the workload weight.

18. The computer program product of claim 16, the method further comprising multiplying the core ratio by a saturation design point ratio before calculating the workload weight.

19. The computer program product of claim 16, the method further comprising adjusting the core ratio based on a virtual machine density of the first machine before calculating the workload weight.

20. The computer program product of claim 16, the method further comprising adjusting the core ratio based on a symmetric multiprocessing scaling ratio before calculating the workload weight.

\* \* \* \* \*